United States Patent
Albalak

(10) Patent No.: US 9,796,637 B2
(45) Date of Patent: Oct. 24, 2017

(54) ENGINEERED STONE AND METHODS OF MANUFACTURING SAME

(75) Inventor: Ramon Albalak, Haifa (IL)

(73) Assignee: CAESARSTONE LTD., Kibbutz Sdot-Yam (IL)

( * ) Notice: Subject to any disclaimer, the term of this patent is extended or adjusted under 35 U.S.C. 154(b) by 0 days.

(21) Appl. No.: 13/500,125

(22) PCT Filed: Oct. 11, 2010

(86) PCT No.: PCT/IB2010/054591
§ 371 (c)(1),
(2), (4) Date: Apr. 4, 2012

(87) PCT Pub. No.: WO2011/045730
PCT Pub. Date: Apr. 21, 2011

(65) Prior Publication Data
US 2012/0196087 A1    Aug. 2, 2012

Related U.S. Application Data

(60) Provisional application No. 61/272,617, filed on Oct. 13, 2009.

(51) Int. Cl.
| | |
|---|---|
| C04B 41/00 | (2006.01) |
| C04B 14/06 | (2006.01) |
| C04B 24/00 | (2006.01) |
| C04B 24/28 | (2006.01) |
| C04B 41/47 | (2006.01) |
| C04B 41/48 | (2006.01) |

(Continued)

(52) U.S. Cl.
CPC ............ *C04B 41/009* (2013.01); *C04B 41/47* (2013.01); *C04B 41/48* (2013.01); *C04B 41/62* (2013.01); *C04B 41/63* (2013.01); *C04B 2111/542* (2013.01); *Y10T 428/24364* (2015.01)

(58) Field of Classification Search
CPC ..... Y10T 428/24364; Y10T 428/24355; Y10T 428/24421; C04B 41/009; C04B 41/47; C04B 41/48; C04B 41/62; C04B 41/63; C04B 14/06; C04B 24/00; C04B 24/283; C04B 41/0045; C04B 2111/542
USPC ................. 428/142; 106/15.05, 2, 270, 272; 427/256, 372.2, 384, 385.5, 508, 514
See application file for complete search history.

(56) References Cited

U.S. PATENT DOCUMENTS

| | | | | |
|---|---|---|---|---|
| 5,364,672 A | * | 11/1994 | Schultze-Kraft | B29C 67/245 428/15 |
| 2002/0143093 A1 | * | 10/2002 | Kolarik | 524/443 |

(Continued)

FOREIGN PATENT DOCUMENTS

| | | | | |
|---|---|---|---|---|
| IT | EP 2020431 A1 | * | 4/2009 | |
| WO | WO 2009075387 A1 | * | 6/2009 | ............ C08F 220/24 |

OTHER PUBLICATIONS

International Search Report for PCT/IB2010/054591 dated Mar. 15, 2011.

*Primary Examiner* — Nathan Van Sell
(74) *Attorney, Agent, or Firm* — Eitan, Mehulal & Sadot

(57) ABSTRACT

Engineered stone, and methods of manufacturing same. An engineered stone comprises: a surface of the engineered stone, wherein the surface comprises one or more pores; and a sealant mixture including a sealant material and a functional component, wherein the functional component modifies one or more properties of said engineered stone.

12 Claims, 3 Drawing Sheets

(51) Int. Cl.
*C04B 41/62* (2006.01)
*C04B 41/63* (2006.01)
*C04B 111/54* (2006.01)

(56) References Cited

U.S. PATENT DOCUMENTS

| | | |
|---|---|---|
| 2004/0121089 A1 | 6/2004 | Whiting |
| 2004/0132843 A1* | 7/2004 | Baumgart et al. ............ 521/50.5 |
| 2004/0161546 A1 | 8/2004 | Clemmer |
| 2005/0065260 A9* | 3/2005 | Kolarik .......................... 524/443 |
| 2006/0057407 A1 | 3/2006 | Sambasivan et al. |
| 2006/0270758 A1 | 11/2006 | Ong et al. |
| 2007/0003791 A1 | 1/2007 | Rochette |
| 2008/0006956 A1* | 1/2008 | Toncelli .................... B28B 7/44 264/71 |
| 2008/0139439 A1* | 6/2008 | Weiss .................. C04B 41/5016 510/240 |
| 2009/0105391 A1* | 4/2009 | Buskila .................. B28B 1/004 524/493 |
| 2010/0261020 A1* | 10/2010 | Fukuda et al. ................ 428/421 |

* cited by examiner

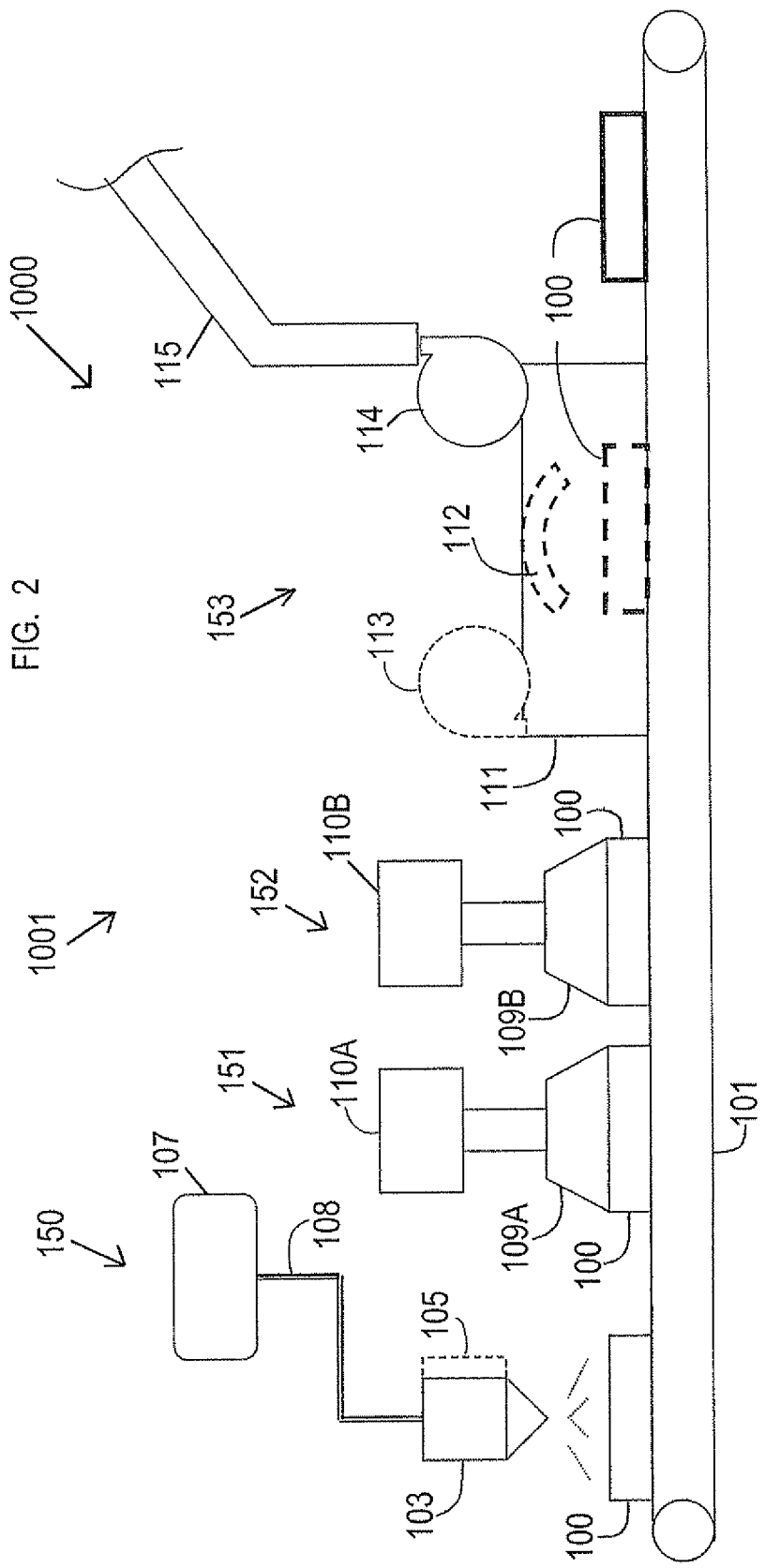

ENGINEERED STONE AND METHODS OF MANUFACTURING SAME

CROSS-REFERENCE TO RELATED APPLICATIONS

This application is a National Phase application of PCT Application PCT/IB2010/054591, entitled "Engineered Stone and Methods of Manufacturing Same", filed Oct. 11, 2010, which claims priority and benefit from U.S. Application 61/272,617, filed on Oct. 13, 2009, both of which are incorporated herein by reference in their entirety.

FIELD OF THE INVENTION

Some embodiments relate to production of composite stone material and items derived therefrom.

BACKGROUND

Engineered stone generally comprises a composite stone material and may include quartz as one of its components. Engineered stone is generally used as an alternative to marble, granite, and other natural stones, frequently in applications where the use of the natural stones may be desirable yet substantially limited due to their relatively high cost compared to engineered stone.

Engineered stone may be typically found in kitchens and bathrooms, for example, used as counter tops, sinks, vanity tops, showers, tubs, bathroom and/or kitchen walls and floor tiles, bathroom partitions, and the like, where water-resistance and hygiene are of importance (engineered stone is relatively easy to clean and resistant to many cleaning chemicals). Engineered stone may also be used, for example, as interior and/or exterior decorative wall tiles (panels), wall bases, tabletops, desktops, floor tiles, steps, and the like.

It is known in the art that certain types of supplementary materials, such as pigments, antibacterial agents and other additives may be added to the blending of raw materials of the engineered stone during the preparation thereof (in other words, prior to the curing of the slabs). However, in order to achieve a desired effect, such as a certain color or an antibacterial activity, these materials should be added at a relatively high quantity.

SUMMARY

In some embodiments, an engineered stone comprises: a surface of the engineered stone, wherein the surface comprises one or more pores; and a sealant mixture including a sealant material and a functional component, wherein the functional component modifies one or more properties of said engineered stone.

In some embodiments, the functional component removes one or more properties of said engineered stone.

In some embodiments, said functional component is of a material category selected from the group material categories consisting of: a pigment, a dye, an antibacterial agent, an anti-fungal agent, an anti-viral agent, an insect repelling agent, an insect eliminating agent, scent material, indicator material, ultraviolet protective agent, heat protective agent, fluorescent agent, phosphorescent agent, anti-slip agent, dirt repellent agent, stain repellent agent, and surface tension modifier.

In some embodiments, said sealant material comprises a material selected from the group consisting of: a polymeric compound, and wax.

In some embodiments, said sealant material is cured.

In some embodiments, said sealant material is cured with ultraviolet light.

In some embodiments, the one or more pores comprise a plurality of pores having different sizes.

In some embodiments, the one or more pores comprise a plurality of pores having substantially similar size.

In some embodiments, an engineered stone surface pore sealant mixture comprises: a sealant material and a functional component, wherein the functional component changes one or more properties of the engineered stone.

In some embodiments, the functional component removes one or more properties of the engineered stone.

In some embodiments, said functional component is of a material category selected from the group material categories consisting of: a pigment, a dye, an antibacterial agent, an anti-fungal agent, an anti-viral agent, an insect repelling agent, an insect eliminating agent, scent material, indicator material, ultraviolet protective agent, heat protective agent, fluorescent agent, phosphorescent agent, anti-slip agent, dirt repellent agent, stain repellent agent, and surface tension modifier.

In some embodiments, said sealant material comprises a material selected from the group consisting of: a polymeric compound, and wax.

In some embodiments, said sealant material is cured.

In some embodiments, said sealant material is cured with ultraviolet light.

In some embodiments, a method of manufacturing an engineered stone comprises: applying a sealant mixture, which comprises a sealant material and a functional component, to a surface of the engineered stone having pores; wherein the functional component changes one or more properties of said engineered stone.

In some embodiments, the functional component removes one or more properties of said engineered stone.

In some embodiments, said functional component is of a material category selected from the group material categories consisting of: a pigment, a dye, an antibacterial agent, an anti-fungal agent, an anti-viral agent, an insect repelling agent, an insect eliminating agent, scent material, indicator material, ultraviolet protective agent, heat protective agent, fluorescent agent, phosphorescent agent, anti-slip agent, dirt repellent agent, stain repellent agent, and surface tension modifier.

In some embodiments, said sealant material comprises a material selected from the group consisting of: a polymeric compound, and wax.

In some embodiments, the method further comprises: curing said sealant material.

In some embodiments, the method further comprises: curing said sealant material with ultraviolet light.

In some embodiments, the pores comprise a plurality of pores having different sizes.

In some embodiments, the pores comprise a plurality of pores having substantially similar size.

In the following description, various aspects of the disclosure will be described. For the purpose of explanation, specific configurations and details are set forth in order to provide a thorough understanding of the disclosure. However, it will also be apparent to one skilled in the art that the embodiments may be practiced without specific details being presented herein. Furthermore, well-known features may be omitted or simplified in order not to obscure the embodiments.

During the manufacturing process of engineered stone, pores (which may be microscopic) are frequently formed. When such pores are formed on a surface of an engineered stone, they allow penetration or development of various undesirable materials into the stone. Such materials may include oils, water, food products, dirt, bacteria, soap, mold and the like. The pores may be sealed prior to using or even prior to selling of engineered stone products. A sealing treatment may include application of polymeric compound(s), which can be mechanically brushed into the pores. The surface of the engineered stone having pores filled with sealant may then be exposed to ultraviolet (UV) radiation adapted to cure and dry the sealant inside the pores, thereby sealing the surface of the engineered stone. The use of sealants is predominately in order to increase the stain resistance of the surface of the engineered stone, similar to the fashion in which countertops made of natural materials, such as granite are sealed. In some cases the surface of the slab must be repolished after sealing in order to obtain the desired shine/gloss.

According to an aspect of some embodiments of the invention, there is provided herein an improved sealant, a method of preparation thereof, and a sealing treatment for an engineered stone. The improved sealant includes, in addition to the sealing material(s), which may include for example polymeric compound(s) waxes or the like, one or more functional components. A functional component may generally refer to any material that can add, remove and/or change one or more properties to the engineered stone, of the surface of the engineered stone and/or of the sealant itself. For example, a functional component may include pigment(s), dye(s), antibacterial agent(s), anti-fungal agent(s), anti-viral agent(s), insect repelling/eliminating agent(s), scent material(s), indicator material(s) (for example material(s) which may provide an indication, such as a visual indication, of pH, bacteria, temperature, or other conditions/parameters, which may reflect one or more properties of the engineered stone or a surface thereof), ultra violet (UV) protection agent(s), heat protection agent(s), fluorescent agent(s), phosphorescent agent(s), anti-slip agent(s) in case of an engineered stone adapted to be used as a floor or other application needing an increased coefficient of friction; dirt repellent, stain repellent, surface tension modifier or any combination thereof.

According to some embodiments of the invention, the one or more functional components may include mixing one or more functional components with one or more of the sealant components (such as a sealing polymer and/or wax), and/or modifying one or more of the sealant components (such as a sealing polymer that may or may not be subsequently cured following application and/or wax) to obtain a desired property and/or function, such as fluorescence, phosphorescence, antibacterial, anti-fungal, anti-viral properties dirt repelling properties, stain repelling properties, surface tension properties and/or any other property and/or function such as, but not limited to, the functions referred to herein.

The term "sealant mix" may refer, according to some embodiments, to a sealant including one or more functional components mixed with one or more of the sealant components and/or to a sealant having one or more sealing components which were modified (such as chemically modified, for example adding a functional group to a molecule) to obtain a desired property and/or function, such as fluorescence, phosphorescence, color change, transparency, opacity, antibacterial, anti-fungal, anti-viral properties, dirt repelling properties, stain repelling properties, surface tension properties and/or any other property and/or function such as, but not limited to, the functions referred to herein.

The sealant may operate as a carrier to facilitate penetration of the one or more functional components into the pores on a surface of the engineered stone. In addition, the use of the functional components with the sealant allows the reduction of the quantities of these functional components, which may save manufacturing costs. A substantial saving in manufacturing costs may be obtained by substantially eliminating, during the manufacturing process, mixing materials required only on surface areas of the engineered stone with raw materials, and instead using functional components with the sealant. In addition, in cases where the functional components are not environmentally "friendly", applying functional components only on the surface of the engineered stone facilitates the production of environmentally "friendlier" slabs.

According to an aspect of some embodiments of the invention, there is provided an improved engineered stone material comprising pores sealed with a sealant comprising one or more functional components.

According to an aspect of some embodiments of the invention, there is provided a method for the preparation of sealant comprising one or more functional components (may also be referred to as a sealant mix). According to some embodiments, the method may include obtaining one or more functional components and mixing it/them with one or more of the sealant components. According to some embodiments, the method may include obtaining one or more sealant components and modifying the one or more sealant components to obtain a desired property and/or function, such as fluorescence, phosphorescence, color change, antibacterial, anti-fungal, anti-viral properties, dirt repelling properties, stain repelling properties, surface tension properties and/or any other property and/or function such as, but not limited to, the functions referred to herein. The terms "modify" or "modifying" may refer to any process performed on a compound (such as a polymer, a resin or any other compound) or a composition (such as a blend of polymers and/or other materials), wherein the process results in a compound or composition having a desired property and/or function. The process may include a chemical process, for example formation and/or disassociation of chemical bonds, such as adding a functional group (a specific group of atoms within a molecule that is responsible for a characteristic of the molecule).

According to some embodiments of the invention, there is provided a system for manufacturing an improved engineered stone, the system including an improved sealing treatment line (ISTL) adapted to apply a sealant having one or more functional components (for example, mixed with the sealant or formed by treatment of one or more of the sealant materials) to pores on a surface of the engineered stone, and further adapted to seal the pores by curing and drying the sealant. The ISTL may include a transport system adapted to move the engineered stone along the treatment line to different treatment stations; a first station comprising equipment adapted to spray the sealant having one or more functional components onto the surface of the engineered stone; a second station comprising equipment adapted to brush the sealant having one or more functional components over the surface of the engineered stone and into the microscopic pores; a third station comprising equipment adapted to remove excess sealant, which did not penetrate into the pores, from the surface of the engineered stone; and a fourth station comprising equipment adapted to cure and dry the sealant, having one or more functional components inside the pores. The system may include any number of stations as may be necessary to meet production demands. Optionally, the stations may include any number or type of equipment as may be necessary to meet production demands.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIG. 2 schematically illustrates an exemplary manufacturing system for the engineered stone shown in FIGS. 1A and 1B, the manufacturing system comprising an exemplary improved sealing treatment line (ISTL), in accordance with an embodiment of the invention.

DETAILED DESCRIPTION

Figure 1A:
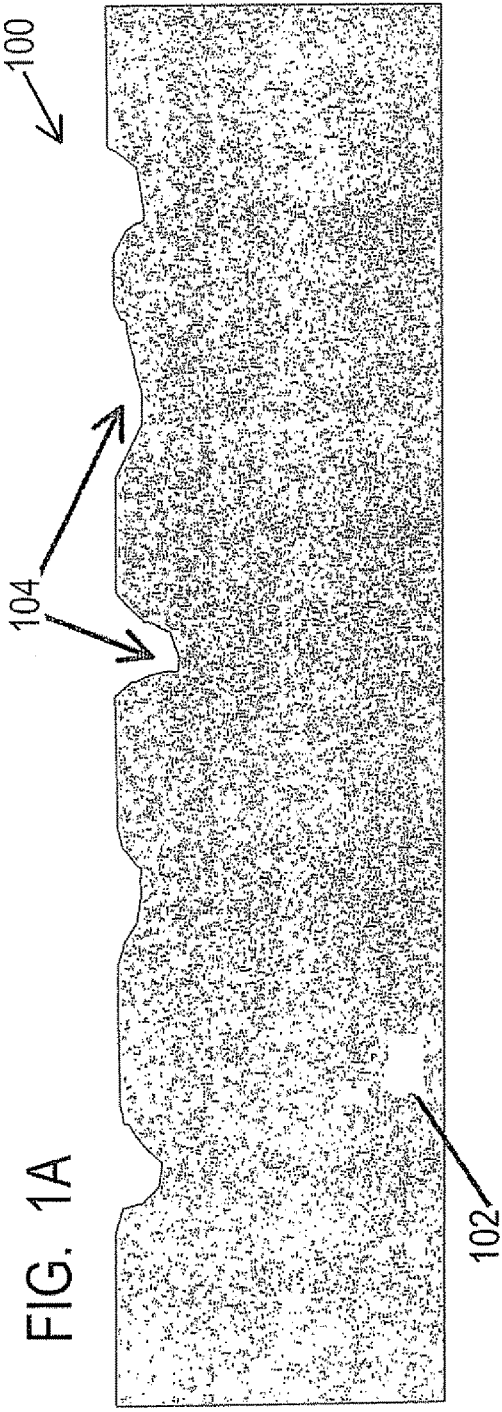
FIG. 1A schematically illustrates an exemplary composite stone material prior to an improved sealing treatment, in accordance with an embodiment of the invention.

As referred to herein, the terms "composite stone", "composite stone material", "slab", "artificial marble", "engineered stone" and "quartz surfaces" may interchangeably be used. Thus, when referencing any of the terms "composite stone", "composite stone material", "slab", "artificial marble", "engineered stone" and "quartz surfaces", it implies that all the terms are covered. For example, when referencing the term "composite stone", the terms "composite stone material", "slab", "artificial marble", "engineered stone" and "quartz surfaces" are also covered.

A composite stone material, such as, for example, artificial marble/engineered stone/quartz surfaces, may be composed of various materials. For example, a composite stone material may be composed mainly of inorganic particulate component and organic polymer(s). The inorganic particulate component may include such components as silicon, basalt, glass, diamond, rocks, pebbles, shells, a variety of quartz containing materials, such as, for example, but not limited to: crushed quartz, sand, quartz particles, and the like, or any combination thereof. For example, the inorganic quartz material may include sand of various particle sizes and in different combinations. Linkage between the organic and inorganic compounds may be carried out and/or facilitated by using binder molecules, such as, for example, mono-functional or multifunctional silane molecules, dendrimeric molecules, and the like, that may have the ability to bind the organic and inorganic components of the composite stone. The binders may further include a mixture of various components, such as initiators, hardeners, catalysts, binding molecules and bridges, or any combination thereof. The manufacturing process of the composite stone material may include blending of raw material (such as inorganic quartz and organic polymers, unsaturated polymers, and the like, such as polyester) at various ratios. For example, the composite stone material may include about 85-95% natural quartz aggregates to about 5-15% polymer resins. For example, the composite stone material may include about 93% natural quartz aggregates and about 7% polymer resins.

In addition, various additives may be added to the blending of the raw materials, at various stages of production. For example, such additives may include, colorants, dyes, pigments, chemical reagents, antimicrobial substances, fungicidal agents, and the like or any combination thereof. As a result of adding various additives to the blending of raw materials, the additives may be present in the final composite stone product and may further change various characteristics of the composite stone. Such characteristics may include, for example, physical properties, such as: color, texture, and the like; chemical properties, such as, for example, chemical resistance, pH properties, and the like; biological properties, such as, for example, antibacterial properties, antimicrobial properties, fungicidal properties, and the like; and mechanical properties, such as, for example, strength, scratch resistance, impact resistance, and the like. The resulting mixture may later be poured to a support or a temporary support, such as rubber, paper, plastic or any other polymeric material, water soluble paper, silicon sheet, or the like, with or without a support frame or a shaping frame, a mold such as a rubber tray mold or any other appropriate support. The mixture is poured substantially in the form of a desired slab (for example, at a size of 308 cm×145 cm with or without wall shaping). The mixture may then be compacted by a special vacuum and vibration process such as vibrocompaction at high pressure, such as about 100 Tons. Then, the compressed mixture may be placed in a curing and/or hardening kiln, for example, at a temperature in the range of 80° C. to 115° C. for 30 to 60 minutes until they harden and assume natural stone properties, but with greater performance and higher resistance to stains and impact, as detailed below. After completion of the casting process, the slabs may be flattened, gauged, calibrated and polished to a high and enduring shine or any desired finish to be used at various settings, such as, for example, interior wall cladding, sinks, fireplace mantles and surroundings, wainscots and wall bases, bank teller lines, table and desktops, elevator cab walls and floors, floor tile and stair treads, food service areas, shower and tub surrounds, toilet compartment partitions, window seats and countertops.

In a further embodiment of this invention, portions of the slab may be masked or covered by mechanical or chemical means prior to sealing, such that only uncovered/unmasked portions of the slab receive the sealing comprising additional functional additives. Optionally, the sealing may not comprise the functional additives. For example, a pattern may be cut out of an adhesive film and attached to the slab prior to sealing. The sealant mix is then applied only to the exposed portions of the slab, creating a contrast in gloss between the different areas of the slab. In a further example, applying a sealant mix containing a dye of pigment to uncovered/unmasked areas would create a color change only in the exposed areas, thus leading to a colored design on the slab following removing the masking medium.

In some embodiments of the invention, the masking medium may comprise an adhesive film adapted to be deactivated by UV radiation. The adhesive on the adhesive film may then be deactivated by a same UV station used to cure the sealant.

Figure 1B:
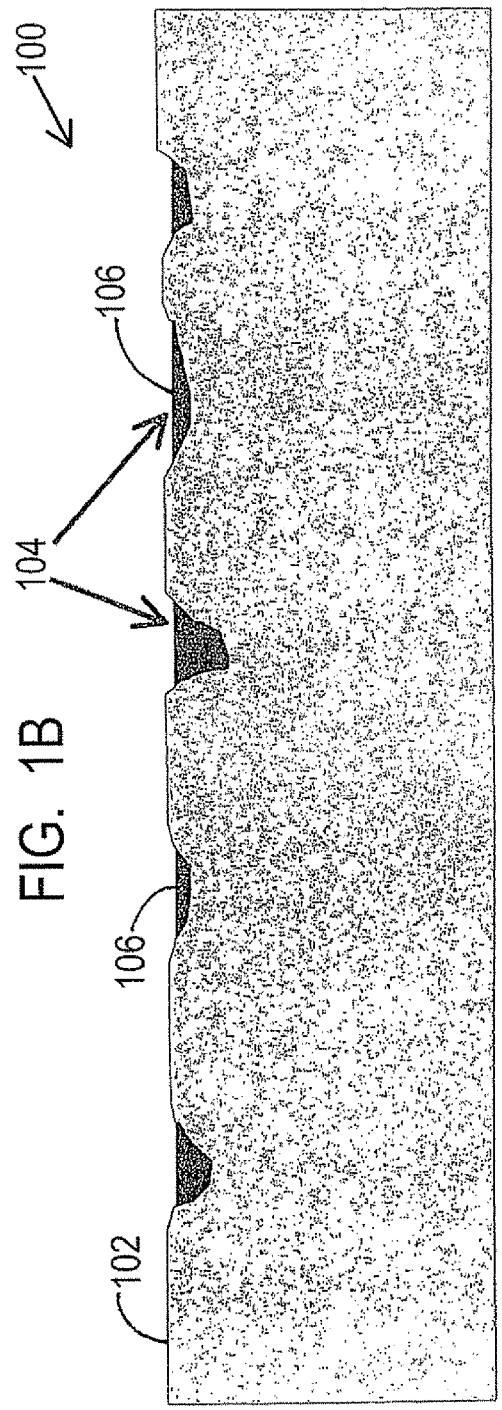
FIG. 1B schematically illustrates the engineered stone of FIG. 1A following the improved sealing treatment, in accordance with an embodiment of the invention.

Reference is made to FIG. 1A, which schematically illustrates an exemplary composite stone material 100 prior to an improved sealing treatment, and to FIG. 1B which schematically illustrates engineered stone 100 following the improved sealing treatment, all in accordance with an embodiment of the invention.

Composite stone material 100 comprises an engineered stone 102, including microscopic pores 104. Engineered stone 102 may be manufactured by any manufacturing process used to produce engineered stone, as known in the art. In accordance with an embodiment of the invention, a sealant mix 106 is applied to the pores 104, the sealant mix comprising one or more functional components. The functional components are adapted to add properties to engineered stone 100. For example, the functional components may include pigments and dyes; antibacterial components; scent essences; indicator chemicals which provide a visual indication responsive to ph, bacteria, temperature, or other conditions which may affect one or more properties of the engineered stone, or any combination thereof; ultra violet (UV) protection agents; fluorescent components; anti-slip agents; and the like; or any combination thereof.

Reference is made to FIG. 2, which schematically illustrates an exemplary manufacturing system 1000 for engineered stone 100 shown in FIGS. 1A and 1B, the manufacturing system comprising an exemplary improved sealing treatment line 1001, in accordance with an embodiment of the invention. Improved sealing treatment line (ISTL) 1001 is adapted to apply sealant mix 106 to pores 104 on engineered stone 100, and further adapted to seal the pores by curing and drying the sealant mix. It may be appreciated by a person skilled in the art that the configuration described below for ISTL 1001 is for illustrative purposes only, and is not intended to be limiting in any manner. ISTL 1001 may comprise numerous configurations based on production demand and production requirements.

In accordance with some embodiments of the invention, ISTL 1000 comprises a transport system 101 adapted to move engineered stone 100 along the treatment line to different treatment stations, for example, a conveyor belt; a first station 150 comprising equipment adapted to spray sealant mix 106 onto the surface of engineered stone 100; a second station 151 comprising equipment adapted to brush sealant mix 106 over the surface of engineered stone 100 and into microscopic pores 104; a third station 152 comprising equipment adapted to remove excess sealant mix 106 from the surface of engineered stone 100; and a fourth station 153 comprising equipment adapted to cure and dry sealant mix 106 inside pores 104. ISTL 1000 may include any number of stations 150-153 as may be necessary to meet production requirements and demands. Optionally, stations 150-153 may include any number or type of equipment as may be necessary to meet production requirements and demands.

ISTL 1000 may be a fully automatic line wherein engineered stone 100 is automatically moved by transport system 101 through stations 150-153, the equipment in each station automatically activated. Optionally, ISTL 1000 may be a semi-automatic line wherein engineered stone 100 is automatically moved by transport system 101 through stations 150-153, and the equipment in each station is activated by trained personnel. Optionally, ISTL 1000 may be a semi-automatic line wherein engineered stone 100 is moved by transport system 101 through stations 150-153 responsive to instructions received from trained personnel, and the equipment in each station is automatically operated once the engineered stone is detected at the station. Optionally, ISTL 1000 may be a semi-automatic line wherein the operation of transport system 101 and the equipment in workstations 150-153 are activated by trained personnel. Optionally, some of the workstations 150-153 may operate automatically and others activated by trained personnel. Optionally, some of the equipment at each workstation 150-153 may be automatically operated and other equipment activated by trained personnel. Optionally, ISTL 1000 may be a semi-automatic line combining any of the previously described embodiments.

First workstation 150 comprises a spray gun 103 adapted to spray sealant mix 106 onto the surface of engineered stone 100, and a storage container 107 adapted to store the sealant having one or more functional components to be used by the spray gun. Sealant 106 is fed through a feed line 108 from storage tank 107 to spray gun 103. First station 151 optionally comprises a detection device 105 adapted to detect when engineered stone 100 is correctly positioned under spray gun 103, prior to spraying of sealant 106.

Second station 151 comprises a first brush 109A adapted to brush sealant mix 106 over the surface of engineered stone 100 and into pores 104. First brush 109A may be connected to an electronic speed controller/pneumatic lifting lowering system (ESC/PLLS) 110A adapted to control a speed of rotation of the brush and/or to lower and lift the brush from the surface of engineered stone 100. In some embodiments of the invention, first brush 109A may comprise a plurality of brushes. It is noted that the term "brush" as referred to herein may cover one or more brushes and/or one or more brushing systems. In case there is more than one brush, the brushes may be the same or different from each other.

Third station 152 comprises a second brush 109B adapted to remove excess sealant mix 106 from the surface of engineered stone 100. Second brush 109B may be connected to an ESC/PLLS 110B adapted to control a speed of rotation of the brush and/or to lower and lift the brush from the surface of engineered stone 100. Optionally, third station 152 is not required, as station 151 may also be adapted to perform the functions of the third station. In some embodiments of the invention, second brush 109B may comprise a plurality of brushes.

Fourth station 153 comprises a UV tunnel 111, which comprises a UV light 112 adapted to cure and dry sealant mix 106 inside pores 104. Fourth station 153 further comprises an extractor 114 adapted to extract contaminated air from tunnel 111, the air removed to the ambient through an exhaust duct 115. The fourth station optionally comprises a blower 113 adapted to blow substantially clean air into UV tunnel 111.

Figure 3:
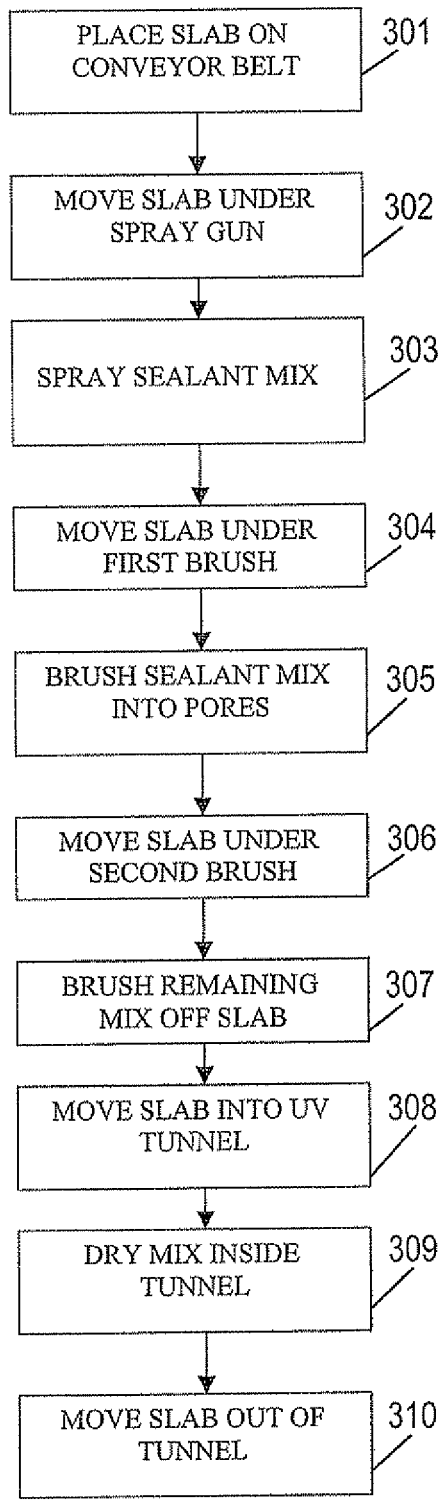
FIG. 3 schematically illustrates a flow diagram of an exemplary method of operation of the ISTL shown in FIG. 2, in accordance with an embodiment of the invention.

Reference is made to FIG. 3, which schematically illustrates a flow diagram of an exemplary method of operation of ISTL 1001 shown in FIG. 2, in accordance with an embodiment of the invention. The method of operation is described for engineered stone 100 shown in FIGS. 1A and 1B, comprising, for example, an artificial marble slab.

[STEP 301] Artificial marble slab 100, which comprises an engineered stone 102 including microscopic pores 104, and was manufactured by any manufacturing process used to produce engineered stone as known in the art, is placed on conveyor belt 101.

[STEP 302] Slab 100 is transported by conveyor belt 101 to station 150 where the slab is positioned under spray gun 103. Determining proper positioning of slab 100 under spray gun 103 may be optionally done by detection device 105.

[STEP 303] Upon proper positioning of slab 100 under spray gun 103, sealant mix 106 flows from storage tank 107 through feed pipe 108, to the spray gun. Spray gun 103 sprays sealant mix 106 over surface of slab 100.

[STEP 304] Slab 100 is transported by conveyor belt 101 to station 151 where the slab is positioned under first brush(es) 109A.

[STEP 305] First brush(es) 109A is(are) lowered onto the surface of slab 100 by ESC/PLLS 110A, and brushes sealant mix 106 into pores 104 in the slab. The rotational speed of first brush(es) 109A and the pressure exerted by the brush(es) on the surface of slab 100 may be controlled by ESC/PLLS 110A.

[STEP 306] Slab 100 is transported by conveyor belt 101 to station 152 where the slab is positioned under second brush 109B.

[STEP 307] Second brush(es) 109B is(are) lowered onto the surface of slab 100 by ESC/PLLS 110B, and brushes excess sealant mix 106 from the surface of the slab. The rotational speed of second brush(es) 109B and the pressure exerted by the brush on the surface of slab 100 may be controlled by ESC/PLLS 110B.

[STEP 308] Slab 100 is transported by conveyor belt 101 to station 153, where the slab is introduced into UV tunnel 111 and placed under UV light 112

[STEP 309] UV light 112 is activated and sealant mix 106 inside pores 104 is cured and dried by the UV light. Clean air is optionally blown into UV tunnel 111 by optional blower 113. Contaminated air inside the tunnel is removed by extractor 114 through exhaust duct 115 to the external ambient. Alternatively, curing and/or drying may be by heat or other means other than UV.

[STEP 310] Slab 100 is transported by conveyor belt 101 out of station 153 having finished the improved sealing treatment.

In the description and claims of embodiments of the present invention, each of the words, "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art.

What is claimed is:

1. An engineered stone comprising:
   a compacted and cured composite stone material comprising about 85-95% by weight natural quartz aggregates and about 5-15% by weight polymer resins, which forms an entirety of the engineered stone, such that the composite stone material forms both (i) a top surface of the engineered stone and (ii) an entire height of the engineered stone;
   wherein said top surface has surface pores therein that are spaced apart by said composite stone material, wherein said surface pores have different sizes;
   wherein only said surface pores are filled with a cured and dried functional sealant filling which directly touches said composite stone material;
   wherein the functional sealant comprises a functional component which modifies one or more properties of said engineered stone,
   wherein said functional component is selected from the group consisting of: an insect repelling agent, an insect eliminating agent, a scent material, an anti-slip material, a dirt repellent agent, a stain repellent agent, an ultraviolet protective agent.

2. The engineered stone of claim 1, wherein the functional component removes one or more properties of said engineered stone.

3. The engineered stone of claim 1, wherein said functional sealant comprises a polymeric compound.

4. The engineered stone of claim 1, wherein said functional sealant comprises wax.

5. The engineered stone of claim 1, wherein said functional sealant comprises sealant material cured with ultraviolet light.

6. The engineered stone of claim 1, wherein a top surface of the engineered stone having the pores filled with the sealant is flat.

7. The engineered stone of claim 1, wherein the pores are filled with at least a heat protective agent.

8. The engineered stone of claim 1, wherein the pores are filled with at least a fluorescent agent.

9. The engineered stone of claim 1, wherein the pores are filled with at least a phosphorescent agent.

10. The engineered stone of claim 1, wherein the pores are filled with at least a surface tension modifier.

11. The engineered stone of claim 1, wherein the entirety of the engineered stone, including the regions of the engineered stones that surround said pores, are uniformly and exclusively formed of said composite stone material.

12. The engineered stone of claim 1, wherein said pores comprise pores that are filled with said sealant that was brushed into said pores.

* * * * *